US008386690B2

(12) United States Patent
Li et al.

(10) Patent No.: US 8,386,690 B2
(45) Date of Patent: Feb. 26, 2013

(54) ON-CHIP NETWORKS FOR FLEXIBLE THREE-DIMENSIONAL CHIP INTEGRATION

(75) Inventors: Jian Li, Austin, TX (US); Steven P. VanderWiel, Rosemount, MN (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 624 days.

(21) Appl. No.: 12/617,859

(22) Filed: Nov. 13, 2009

(65) Prior Publication Data

US 2011/0119322 A1    May 19, 2011

(51) Int. Cl.
*G06F 13/00*    (2006.01)
*H01L 25/00*    (2006.01)

(52) U.S. Cl. .......................................... 710/316; 326/47
(58) Field of Classification Search .................. 710/105, 710/305, 306, 316, 317; 326/47, 38, 39, 326/41

See application file for complete search history.

(56) References Cited

U.S. PATENT DOCUMENTS

| | | | |
|---|---|---|---|
| 5,032,896 A | 7/1991 | Little et al. | |
| 5,373,189 A | 12/1994 | Massit et al. | |
| 6,133,626 A | 10/2000 | Hawke et al. | |
| 6,819,136 B2 * | 11/2004 | Or-Bach | 326/41 |
| 7,064,579 B2 * | 6/2006 | Madurawe | 326/39 |
| 7,282,951 B2 * | 10/2007 | Huppenthal et al. | 326/41 |
| 7,615,857 B1 | 11/2009 | Jouppi | |
| 2009/0066365 A1 * | 3/2009 | Solomon | 326/41 |
| 2009/0070549 A1 | 3/2009 | Solomon | |
| 2009/0070727 A1 * | 3/2009 | Solomon | 716/16 |
| 2009/0201082 A1 * | 8/2009 | Smith et al. | 327/544 |
| 2011/0084365 A1 * | 4/2011 | Law et al. | 257/621 |
| 2011/0121366 A1 * | 5/2011 | Or-Bach et al. | 257/204 |
| 2011/0121456 A1 * | 5/2011 | Caron et al. | 257/741 |

OTHER PUBLICATIONS

Black, Bryan et al., "Die Stacking (3D) Microarchitecture", 39th Annual IEEE/ACM International Symposium on Microarchitecture (MICRO'06), 2006, 11 pages.
Loh, Gabriel H., "3D-Stacked Memory Architectures for Multi-Core Processors", Proceedings of the 35th ACM/IEEE International Conference on Computer Architecture, Jun. 2008, pp. 1-14.
Loh, Gabriel H. et al., "Extending the Effectiveness of 3D-Stacked DRAM Caches with an Adaptive Multi-Queue Policy", MICRO'09, Dec. 12-16, 2009, 12 pages.
Puttaswamy, Kiran et al., "Scalability of 3D-Integrated Arithmetic Units in High-Performance Microprocessors", DAC 2007, Jun. 4-8, 2007, 4 pages.

(Continued)

*Primary Examiner* — Khanh Dang
(74) *Attorney, Agent, or Firm* — Stephen J. Walder, Jr.; Eustus D. Nelson

(57) ABSTRACT

Mechanisms for providing an interconnect layer of a three-dimensional integrated circuit device having multiple independent and cooperative on-chip networks are provided. With regard to an apparatus implementing the interconnect layer, such an apparatus comprises a first integrated circuit layer comprising one or more first functional units and an interconnect layer coupled to the first integrated circuit layer. The first integrated circuit layer and interconnect layer are integrated with one another into a single three-dimensional integrated circuit. The interconnect layer comprises a plurality of independent on-chip communication networks that are independently operable and independently able to be powered on and off, each on-chip communication network comprising a plurality of point-to-point communication links coupled together by a plurality of connection points. The one or more first functional units are coupled to a first independent on-chip communication network of the interconnect layer.

18 Claims, 9 Drawing Sheets

OTHER PUBLICATIONS

Topol, A.W. et al., "Three-dimensional integrated circuits", IBM Corporation, IBM J. Res. & Dev., vol. 50, No. 4/5, Jul./Sep. 2006, pp. 491-506.

Vangal, Sriram et al., "An 80-Tile 1.28TFLOPS Network-on-Chip in 65nm CMOS", IEEE International Solid-State Circuits Conference, ISSCC 2007, Session 5, Microprocessors, 5.2, 2007, pp. 98-99 and 589.

Wu, Xiaoxia et al., "Hybrid Cache Architecture with Disparate Memory Technologies", ISCA'09, Jun. 20-24, 2009, 12 pages.

Bartley, Gerald K. et al., "Universal Inter-Layer Interconnect for Multi-Layer Semiconductor Stacks", U.S. Appl. No. 12/431,259, filed Apr. 28, 2009, 46 pages.

Anagnostopoulos, Iraklis et al., "NODE Resource Management for DSP Applications on 3D Network-On-Chip Architecture", Digital Signal Processing, 2009 16th International Conference on Jul. 5-7, 2009, pp. 1-6.

Chen, Yiou et al., "De Bruijn Graph based 3D Network on Chip Architecture Design", Communications, Circuits and Systems, 2009, ICCCAS 2009, International Conference on Jul. 23-25, 2009, pp. 986-990.

Chou, Shu-Hsuan et al., "No Cache-Coherence: A Single-Cycle Ring Interconnection for Multi-Core L1-NUCA Sharing on 3D Chips", Design Automation Conference, 2009, DAC '09, 46th ACM/IEEE Jul. 26-31, 2009, pp. 587-592.

Park, Dongkook et al., "MIRA: A Multi-Layered On-Chip Interconnect Router Architecture", Computer Architecture, 2008, ISCA '08, 35th International Symposium on Jun. 21-25, 2008, pp. 251-261.

Pavlidis, Vasilis et al., "Interconnect-Based Design Methodologies for Three-Dimensional Integrated Circuits", Proceedings of the IEEE, vol. 97, Issue 1, Jan. 2009, pp. 123-140.

Sabbaghi-Nadooshan, Reza et al., "The Kautz Mesh: A New Topology for SoCs", SoC Design Conference, 2008, ISOCC '08, International vol. 1, Nov. 24-25, 2008, pp. I-300-I-303.

Seiculescu, Ciprian et al., "SunFloor 3D: A Tool for Networks on Chip Topology Synthesis for 3D Systems on Chips", Design, Automation & Test in Europe Conference & Exhibition, 2009, Date '09, Apr. 20-24, 2009, pp. 9-14.

Sharifi, Akbar et al., "The Shuffle-Exchange Mesh Topology for 3D NoCs", Parallel Architectures, Algorithms, and Networks, 2008, I-SPAN 2008, International Symposium on May 7-9, 2008, pp. 275-280.

\* cited by examiner

US 8,386,690 B2

ON-CHIP NETWORKS FOR FLEXIBLE THREE-DIMENSIONAL CHIP INTEGRATION

BACKGROUND

The present application relates generally to an improved data processing apparatus and method and more specifically to mechanisms for providing improved on-chip networks for flexible three-dimensional chip integration.

A three-dimensional integrated circuit is a chip with two or more layers of active electronic components, integrated both vertically and horizontally into a single circuit. A three-dimensional integrated circuit chip is a single chip in which all components on the layers communicate with on-chip signaling, whether vertically or horizontally. In contrast to three-dimensional integrated circuits, three dimensional packaging involves a plurality of chips packaged into a single package but which are not integrated with each other into a single circuit. With three dimensional packages, communication must be made through off-chip mechanisms due to the fact that the chips are not integrated with each other.

Three-dimensional packaging saves space by stacking separate chips in a single package. However, three-dimensional integrated circuits provide many benefits including a smaller footprint (since more functionality fits into a smaller space), faster speed (the average wire length is much shorter), reduced power consumption, heterogeneous integrated (circuit layers can be built with different processes, different technologies, and may be supplied by different vendors), and increased circuit security (the stacked structure hinders attempts to reverse engineer the circuitry).

While three-dimensional integrated circuits provide these various benefits, three-dimensional integrated circuits lack flexibility with regard to the interconnect layer used to handle communication between the integrated layers of the three-dimensional integrated circuit. That is, the interconnect layer has a single pattern of wiring that is optimized for a single type of integrated circuit chip and which is inefficient or unable to support other integrated circuit chip designs. Moreover, because of this inflexibility of the interconnect layer, the compute and storage layers are tightly coupled with a fixed matching between them using the interconnect layer.

SUMMARY

Mechanisms for providing an interconnect layer of a three-dimensional integrated circuit device having multiple independent and cooperative on-chip networks are provided. With regard to an apparatus implementing the interconnect layer, such an apparatus comprises a first integrated circuit layer comprising one or more first functional units and an interconnect layer coupled to the first integrated circuit layer. The first integrated circuit layer and interconnect layer are integrated with one another into a single three-dimensional integrated circuit. The interconnect layer comprises a plurality of independent on-chip communication networks that are independently operable and independently able to be powered on and off, each on-chip communication network comprising a plurality of point-to-point communication links coupled together by a plurality of connection points. The one or more first functional units are coupled to a first independent on-chip communication network of the interconnect layer.

A second integrated circuit layer comprising one or more second functional units may also be provided. The second integrated circuit layer may be coupled to the interconnect layer and the one or more second functional units may be coupled to a second independent on-chip communication network of the interconnect layer. The first independent on-chip communication network may have a different granularity with regard to positioning of connection points than a granularity of the second independent on-chip communication network.

In other illustrative embodiments an interconnect layer for a three-dimensional integrated circuit is provided. The interconnect layer comprises a first independent on-chip communication network comprising a first plurality of point-to-point communication links and a first plurality of connection points between point-to-point communication links. The interconnect layer further comprises a second independent on-chip communication network comprising a second plurality of point-to-point communication links and a second plurality of connection points between point-to-point communication links. Each of the first and second independent on-chip communication networks is able to be coupled to one or more integrated circuit layers of the three-dimensional integrated circuit to thereby integrate the one or more integrated circuit layers with the interconnect layer. The first and second independent on-chip communication networks are independently operable and independently able to be powered on and off.

In addition, the interconnect layer may, in response to the first independent on-chip communication network being coupled to a first integrated circuit layer, and the second independent on-chip communication network being not used, power off the second independent on-chip communication network. Furthermore, the first independent on-chip communication network may have a different granularity with regard to positioning of the first plurality of connection points than a granularity of the second independent on-chip communication network with regard to the second plurality of connection points.

In still further illustrative embodiments, a method for providing such an interconnect layer and/or an apparatus implementing such an interconnect layer is provided. The method may provide the various layers, on-chip communication networks, and the like.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms for providing improved on-chip networks for flexible three-dimensional chip integration. The mechanisms of the illustrative embodiments provide a single interconnect layer of a three-dimensional integrated circuit which has a plurality of on-chip communication networks provided therein. The plurality of on-chip communication networks are independently able to be powered on and off. In one illustrative embodiment, each on-chip communication network has a different granularity, with regard to the number and placement of routers in the communication network, than that of the other on-chip communication networks provided on the interconnect layer. In some illustrative embodiments, one or more of the routers in the each of the plurality of communication networks may act as an interface between the two or more of the on-chip communication networks such that communication may be made across on-chip communication networks. Such communication can take advantage of the different granularities of the on-chip communication networks to achieve faster communication depending upon the destination of the communication and the configuration of the communication networks.

Using such an interconnect layer, the compute layer, or core layer, where the processor cores and corresponding logic are provided, may be de-coupled from storage layers, e.g., disk layers, solid state disk (SSD) layers, cache memory layers, system memory layers, or the like, such that each of the compute and storage layers may be provided with different technologies, processes, and vendors. That is, the interconnect layer of the illustrative embodiments need not be customized for operation with a single type of chip and instead, provides a plurality of on-chip communication networks that can be used with a plurality of different types of compute and storage layers. For example, the compute layer may make use of a first on-chip communication network of the interconnect layer while a storage layer may make use of a second on-chip communication network of the interconnect layer that has a different granularity, topology, or both than that of the first on-chip communication network. In one illustrative embodiment, interfaces may be provided between the first and second on-chip communication networks such that the compute layer may communicate with the storage layer and vice versa using a combination of on-chip communication networks. Moreover, each communication network may be independently powered on/off when desired, such as to conserve power, for example.

Figure 1A:
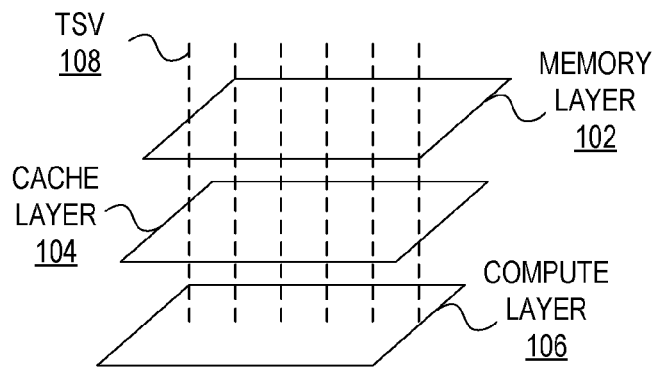
FIGS. 1A-1D are example diagrams of various three-dimensional integrated circuit configurations.

FIGS. 1A-1D are example diagrams of various three-dimensional integrated circuit configurations. FIG. 1A illustrates a cache/memory stacking configuration for a three-dimensional integrated circuit. As shown in FIG. 1A, the memory layer die 102 and cache layer die 104 are stacked on top of the compute layer die 106 in a vertical manner. Through silicon vias (TSVs) 108 are provided passing through each layer 102-106 to allow communication from one layer to the next. While TSVs are utilized for illustrative purposes in the description of the illustrative embodiments, it should be appreciated that other three-dimensional integration technologies, such as microbump, wire bonding, contactless (capacitive or inductive), and other types of connections can also be used without departing from the spirit and scope of the illustrative embodiments. Communication within each layer 102-106 is made possible by wiring integrated into each layer 102-106. Thus, through the wiring within each layer 102-106 and the vertical TSVs 108, communication throughout the three-dimensional integrated circuit is made possible. It should be appreciated, however that such communication is specific to the types of dies 102-106 provided. There is not flexibility in the configuration of the wiring patterns used in each die 102-106.

Figure 1B:
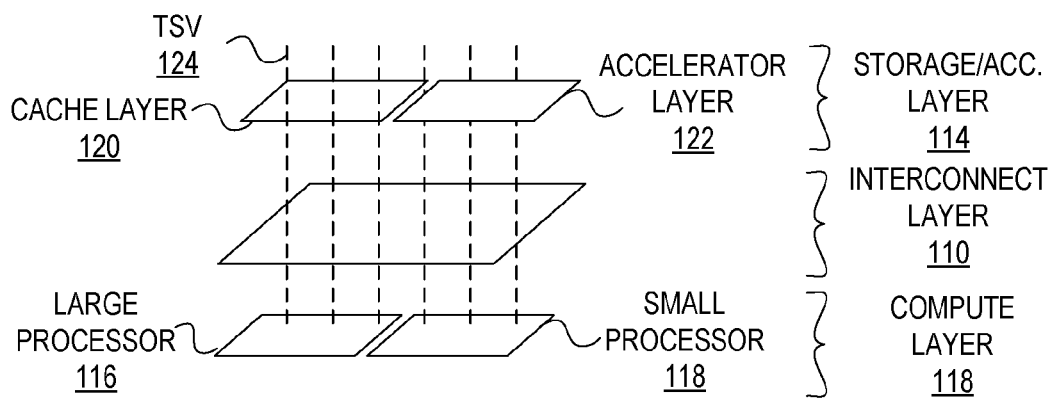

FIG. 1B illustrates another three-dimensional integrated circuit configuration in which an interconnect layer 110 is provided between the compute layer die 112 and the storage layer die 114. The compute layer die 112 may be comprised of a layer of large processors 116 optimized for single thread performance and a layer of small processors 118 optimized for throughput performance. Typically, processors with complicated pipeline and powerful functional units, which consume larger chip area, are designed to improve instruction level parallelism (ILP), i.e. single thread performance. Within the same power and chip area budget, however, it has been demonstrated that many more smaller processors with simpler pipeline and simpler/fewer functional units may improve the overall instruction throughput at chip level, given that multiple application threads are available to utilize these many smaller processors. Since the overall instruction throughput comes from more threads running on more but smaller and slower processors, such parallelism to improve chip-level performance is called thread level parallelism (TLP). On the other hand, since some workloads (mainly sequential programs or sequential phases of a parallel program, for example) prefer single-thread performance and others (parallel scientific programs, server workloads, etc.) prefer multi-threaded throughput, it has been proposed to design so-called Asymmetric/Heterogeneous multi-core chips, instead of conventional homogeneous multi-core chips, to serve both types of workloads well. Furthermore, application specific accelerators have been proposed to further improve performance of some workloads. FIG. 1B illustrates an example of such an asymmetric/heterogeneous multi-core chip having large processors, small processors, and accelerators in the three dimensional context for such a design scenario.

In FIG. 1B, the storage/accelerator layer die 114 is comprised of a cache layer 120 and an accelerator layer 122, which is a layer built with accelerators, such as processing units that are specialized for encryption, decryption, memory compression, high-performance vector processing, graphic units, etc. In some embodiments, the accelerator layer 122 comprises units designed to speed up the address translation process. It is expected that, for certain three dimensional integration scenarios, one can integrate a few small dies with a big interconnect die. Therefore, the four small layers in FIG. 1B are four different dies. Note that, small die size tends to improve yield and reduce manufacture cost.

The interconnect layer 110 has a similar size as the maximum die size of all the layers 116-122 of the dies 112 and 114. It should be noted that the interconnect layer 110 does not have to have the same size as the maximum die size of all the layers 116-122 since the size of the interconnect layer 110 is dependent upon the position of the TSVs 124. As long as the interconnect layer 110 covers all of the TSVs 124, it can achieve the same effect without being of the same size as the maximum die size of all of the layers 116-122.

As with the configuration shown in FIG. 1A, TSVs 124 are provided as vertical communication paths between the layers 110 and 116-122. Again, the interconnect layer 110 is specifically designed for use with the particular layers 110 and 116-122 and does not provide any flexibility to be used with other types of chips or dies. That is, if a change is to be made to one of the layers 116-122, with regard to the type of chip or die being used, the technology being used, the process being used, the vendor from which the chip or die is to be obtained, then the interconnect layer 110 must be redesigned for the newly changed layers 116-122. Alternatively, the chips or dies must be designed to utilize the specific interconnect layer 110.

Figure 1C:
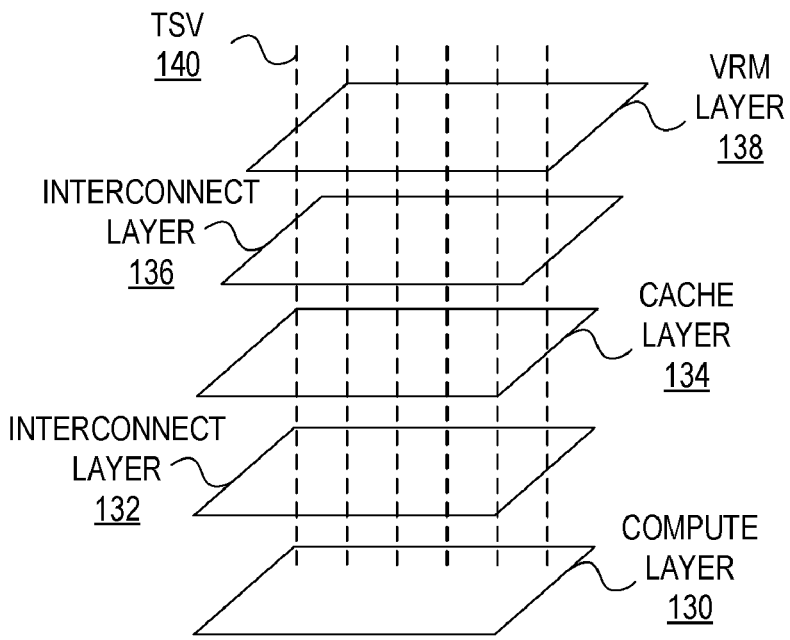

FIG. 1C illustrates a third three-dimensional integrated circuit device configuration in which multiple interconnect layers are utilized. As shown in FIG. 1C, a compute, or core, layer 130 is provided as a bottom layer with an interconnect layer 132 being provided between the compute layer 130 and a cache layer 134. A second interconnect layer 136 couples the cache layer 134 with a voltage regulation module layer 138. Again, TSVs 140 are provided for vertical communication through the layers 130-138. Even though two interconnect layers 132 and 136 are provided in this configuration, each interconnect layer 132 and 136 is likewise inflexible for the same reasons as noted above with regard to FIG. 1B.

Figure 1D:
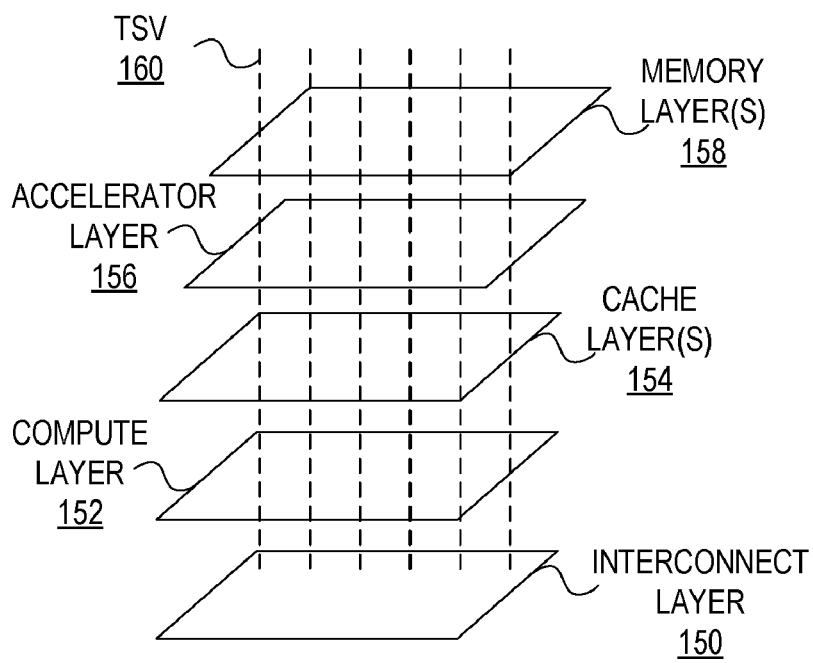

FIG. 1D illustrates a fourth three-dimensional integrated circuit device configuration in which a single master interconnect layer 150 is provided at the base of the structure. On top of the interconnect layer 150, the various other layers, e.g., compute layer 152, cache layer(s) 154, accelerator layer 156, and memory layer(s) 158, are provided and communicate with the interconnect layer 150 via the TSVs 160. With this configuration, the master interconnect layer 150 provides all of the input/output interfaces and thus, it is often convenient to use this interconnect layer 150 to allow off-chip interconnections.

In each of these configurations, the interconnect layer is inflexible and is comprised of a single on-chip network. An on-chip network is an on-chip construction of point-to-point data links interconnected by switches or routers such that messages can be relayed from any source module or unit to any destination module or unit over a plurality of these links by making routing decisions at the switches or routers. By having only a single on-chip network in the interconnect layer that is specifically designed for use with a particular type of chip or die to which the interconnect layer is coupled, e.g., the type of chip or die used for the compute layer, storage layer, or the like, there is little or no flexibility of use of this interconnect layer with different types of chip or die technologies, processes, or vendors.

Figure 2:
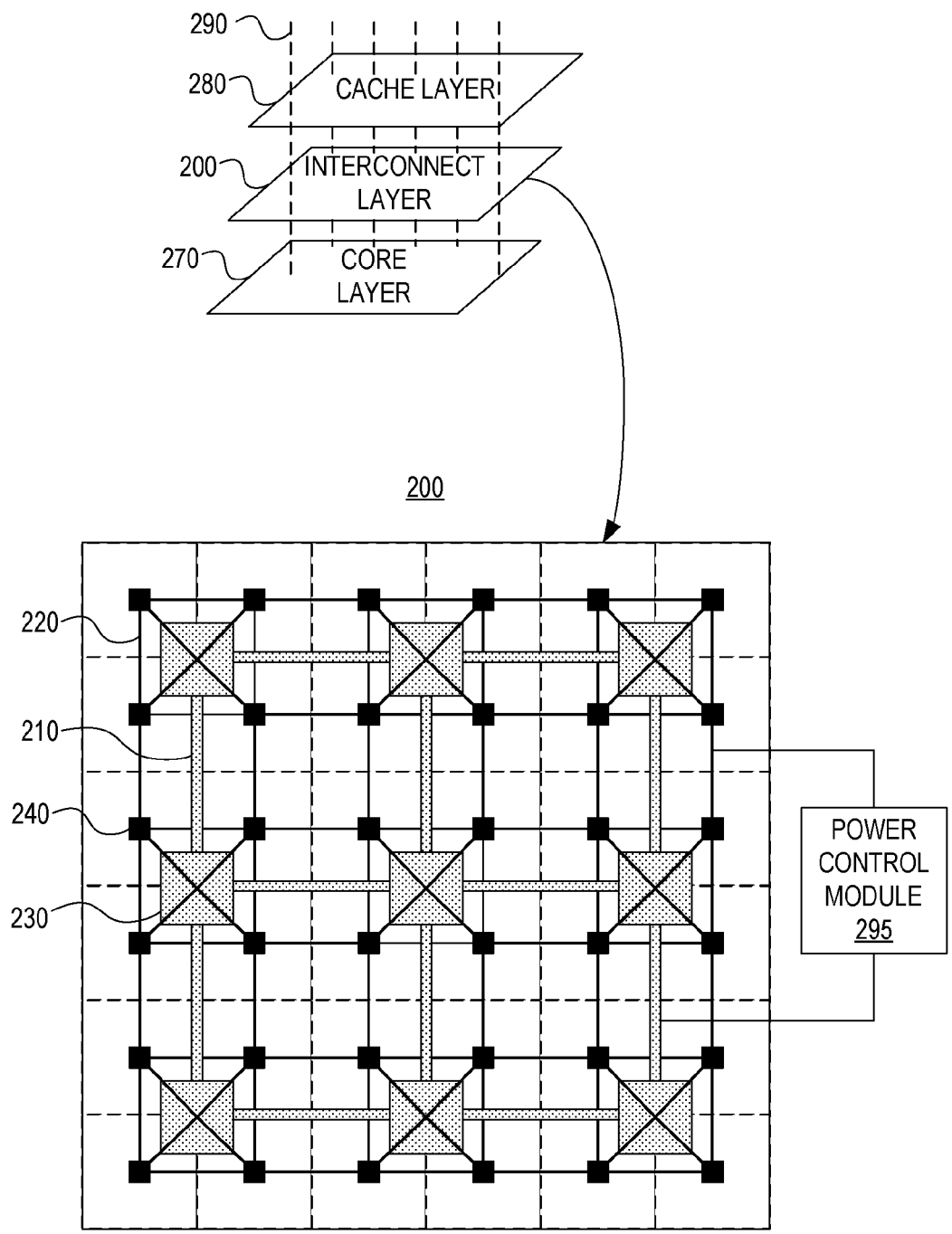
FIG. 2 is an example diagram of a three-dimensional integrated circuit interconnect layer in accordance with one illustrative embodiment.

FIG. 2 is an example diagram of a three-dimensional integrated circuit interconnect layer in accordance with one illustrative embodiment. Contrary to the interconnect layers of the configurations shown in FIGS. 1A-1C, the interconnect layer 200 of the illustrative embodiment shown in FIG. 2 provides a plurality of on-chip networks 210-220 in a single interconnect layer 200. Although FIG. 2 only shows two on-chip networks 210-220, it should be appreciated that more than two on-chip networks 210-220 may be provided without departing from the spirit and scope of the illustrative embodiments.

The on-chip networks 210-220 are each comprised of on-chip point-to-point data communication links, e.g., wires, and switches/routers 230, 240 (hereafter referred to simply as "routers."). The routers 230, 240 are devices to forward network messages from one link/wire to another. A router typically has ports that connect to links which build up the network. Internally, it typically has a cross-bar architecture that connects its input and output ports on both sides. Information of the network path for a message is stored in a routing table in the router, or generated by the router, or informed by software, etc. The router then can route a message from an input port to an output port that connects to the appropriate link or links toward the destination. Arbitration decision is made inside the router, at any or all of the input, cross-bar, and output stages, to improve the utilization of the router, i.e., reducing the idle cycles of a router.

It should be noted that while routers 230 and 240 are utilized in these example embodiments, the invention is not limited to such. Rather, any type of connection point where data/messages may be relayed to a different point-to-point communication link may be used without departing from the spirit and scope of the illustrative embodiments. For example, rather than using routers, a broadcast bus, a segmented bus (where wires are connected together through repeaters and latches), or the like, can be used without departing from the scope of the illustrative embodiments. Such a connection point may be a connection point comprised of a router, a group of repeaters, a group of latches, simply a group of gates, or the like.

The placement or the routers 230, 240 may be of different granularities in each of the on-chip networks. For example, a first on-chip network 210 may be comprised of a 3×3 mesh in which there are three routers 230 provided in each column and row of the mesh, connected by wires. For example, these routers 230 may be associate with cores of a compute or core layer 270 such that the core layer 270 has nine cores and the first on-chip network 210 similarly has nine routers 230 for communication between cores of the core layer 270 and/or cache banks of the cache layer 280. A cache bank is a subset of a cache having a subset of cache storage elements. Separating a cache into cache banks improves the performance of a cache without requiring the same area overhead as a monolithic cache with the same amount of data ports. The size of a cache bank can be determined by the target cache access latency, data transfer rate, chip area allocated to caches, etc. In short, a cache bank is the minimal unit within a cache that can be accessed independently.

A second on-chip network 220 may be comprised of a 6×6 mesh, in which there are six routers 240 provided in each column and row of the mesh, connected by wires. In the depicted configuration, each core in the core layer 270 may be physically associated with four routers in this second on-chip network 220, for example.

Thus, the first on-chip network 210 may represent a coarse-grain mesh while the second on-chip network 220 represents a fine-grained mesh. Each of the on-chip networks 210 and 220 is independently able to be powered on/off by an on-chip power control module 295. The power control module can function as a multiplexer to connect to a plurality of sleep transistors, each of which is responsible to power gate (shut down) a network. The location of the power control module is not necessarily fixed on the interconnect layer. If a VRM layer is available, the power control module can be conveniently located in the VRM layer.

The on-chip power control module 295 may turn on/off the power to one or more of the on-chip networks 210, 220 according to sensed conditions, control signals provided by another control module (not shown), or the like. For example, based on a sensed condition or a control signal from another control module, the on-chip power control module 295 may allow or inhibit power flow to the on-chip networks 210, 220, such as to conserve power during the operation of the integrated circuit device when necessary, e.g., when the on-chip network is not being used for communication.

Each of the on-chip networks 210, 220 may operate independently of the other on-chip networks 210, 220. Moreover, the layers 270 and 280 to which the interconnect layer 200 is coupled may each utilize different ones of the on-chip networks 210, 220 independently. For example, the core layer 270 may utilize the coarse-grained on-chip network 210 for communication amongst the processor cores of the core layer 270. The cache banks of the cache layer 280 may utilize the fine-grained on-chip network 220 to transfer data amongst the cache banks. Each of the on-chip networks 210, 220 may support the typical communication traffic used by such other layers 270 and 280.

As shown in FIG. 2, through silicon vias (TSVs) 290 are provided for vertical communication through the various layers 200, 270 and 280 of the three-dimensional integrated circuit device. With the depicted configuration of the on-chip networks 230, 240, a total of 45 TSVs 290 are utilized (6×6+3×3=45). Thus, a TSV is associated with each of the routers in the various on-chip networks 230, 240. The TSVs 290 provide communication pathways from one layer 270 to another 280 via the interconnect layer 200 via the routers 230, 240 of one or more of the on-chip networks 210, 220.

In addition to the wiring within each on-chip network's mesh, and the TSVs 290 provided through the various layers 200, 270 and 280, one or more of the routers 230, 240 in two or more of the on-chip network 210, 220 may be provided with additional ports for coupling the router 230 in one on-chip network 210 to a router 240 in another on-chip network 220. That is, a bus, x-bar, or point-to-point interface between the two on-chip networks 210, 220 may be provided via ports on routers 230, 240 of the on-chip networks 210, 220. These connections are depicted in FIG. 2 as the "X" structures superimposed on the routers 230 of the on-chip network 210 with termination points at the routers 240 in the on-chip network 220.

These interfaces allow communications to utilize more than one on-chip network 210, 220 to facilitate communication from a source element to a destination element of the three-dimensional integrated circuit device using the most efficient communication path available. For example, if a first cache bank in the top left of the configuration shown in FIG. 2 wishes to communicate data with a second cache bank in the bottom right of the configuration shown in FIG. 2, there are a number of different paths that may be taken depending upon whether the communication makes use of a single on-chip network 210, 220 or not. That is, the first cache bank can use either the fine-grained on-chip network 220 alone to communicate with the second cache bank or the first cache bank may make use of a combination of the fine-grained on-chip network 220 and the coarse-grained on-chip network 210. If the first cache bank uses only the fine-grained on-chip network 220, then 10 hops from router-to-router would be needed.

However, if the processor core uses a combination of the fine-grained on-chip network 220 and the coarse-grained on-chip network 210, then the communication may be from a first router in the fine-grained on-chip network 220 to an adjacent router in the coarse-grained on-chip network 210 (1 hop). The communication may then continue along the coarse-grained on-chip network 210 (resulting in 4 hops) with a final cross-over to the fine-grained on-chip network 220 at the coarse-grained on-chip network router in the lower right of the diagram to the fine-grained on-chip network router in the lower right of the diagram (1 hop). Thus, by using a combination of the on-chip networks, the communication can be achieved in 6 hops as opposed to 10 hops, resulting in faster communication and higher link bandwidth.

It should be appreciated that the interconnect layer 200 configuration shown in FIG. 2 may support core layers 270 and cache layers 280 of various types. For example, the combination of coarse-grained on-chip network 210 and fine-grained on-chip network 220 in the depicted example allows core layers of 1 to 36 cores and cache layers of from 1 to 36 cache banks. With different granularities of on-chip networks, different numbers of elements, and thus, different types of chips or dies, are made possible while still providing fast path meshes for efficiently providing communication between elements of the layers. Moreover, the configurations of such elements may be of various types, technologies, and vendors as long as they can interface with one or more of the routers of one or more of the on-chip networks 210, 220.

Figure 3:
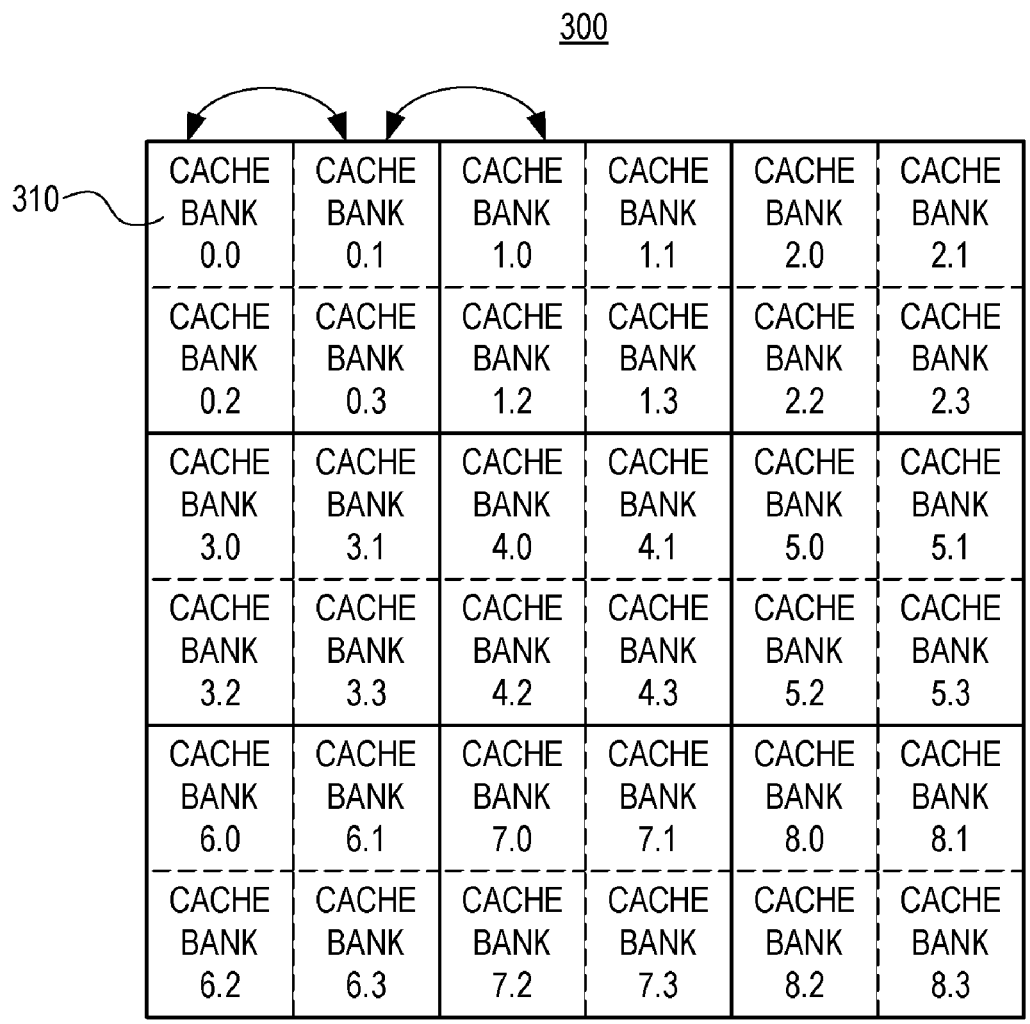
FIG. 3 is an example diagram of a cache layer of a three-dimensional integrated circuit in accordance with one illustrative embodiment.

FIG. 3 is an example diagram of a cache layer of a three-dimensional integrated circuit in accordance with one illustrative embodiment. As shown in FIG. 3, the cache layer 300 is comprised of a plurality of cache banks 310. The cache banks are numbered with a numbering convention comprised of the processor core number followed by the cache bank number (numbered from 0 to n), e.g., 0.2 represents cache bank 2 of processor core 0.

Comparing FIG. 3 to the example interconnect layer of FIG. 2, it can be seen that the routers 240 of the fine-grained on-chip network 220 correspond to the cache banks 310 of the cache layer 300. As such, the fine-grained on-chip network 220 is especially well suited for communication between neighboring cache banks, such as transferring a cache line from cache bank 0.0 to cache bank 0.1 or the like. Moreover, the fine-grained on-chip network 220 allows for efficient transfer of cache lines between neighboring or adjacent caches in the cache layer 300. For example, a transfer of a cache line between cache bank 0.1 and cache bank 1.0 requires only a single hop along the fine-grained on-chip network 220.

Figure 4:
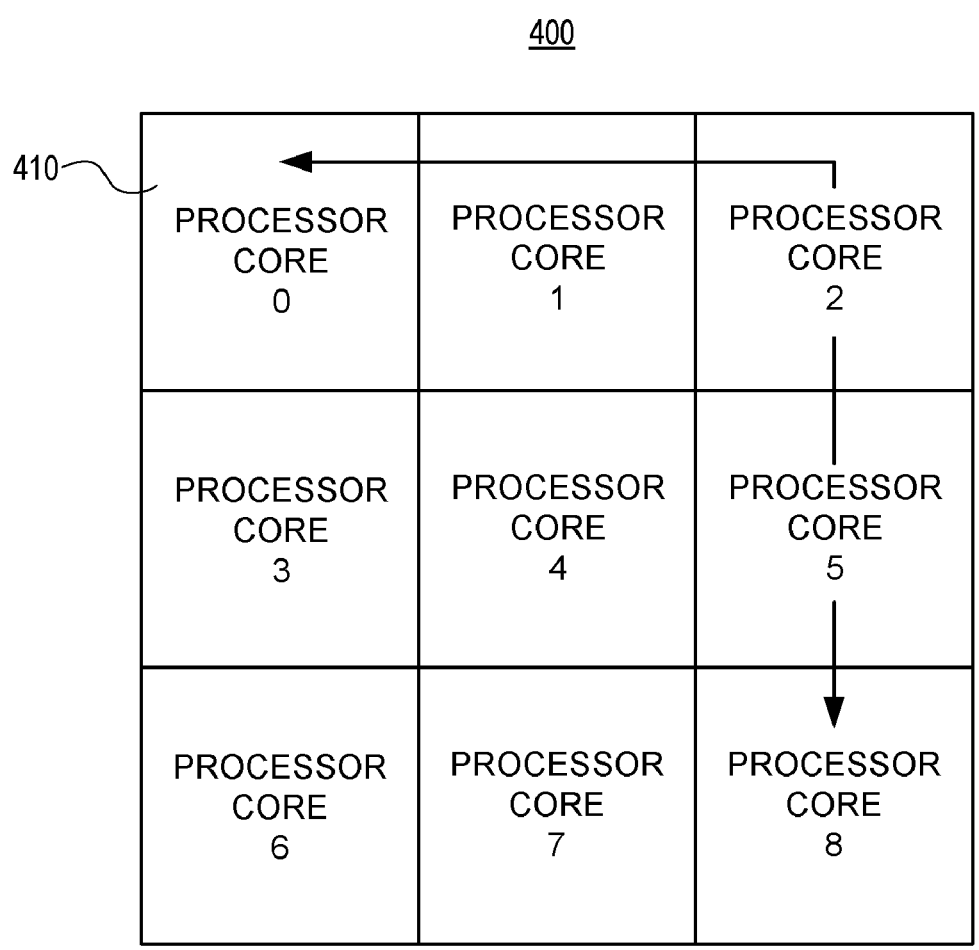
FIG. 4 is an example diagram of a core layer, or compute layer, of a three-dimensional integrated circuit in accordance with one illustrative embodiment.

FIG. 4 is an example diagram of a core layer, or compute layer, of a three-dimensional integrated circuit in accordance with one illustrative embodiment. As shown in FIG. 4, each core 410 in the core layer 400 is number 0 to 8, corresponding to the cache layer 300 cache bank 310 numberings. Comparing FIG. 4 with the interconnect layer of FIG. 2, it can be seen that the routers 230 of the coarse-grained on-chip network 210 correspond to the cores 410 of the core layer 400. The coarse-grained on-chip network 210 provides support for faster global data communication between cores/caches that are further apart from each other. For example, using the coarse-grained on-chip network 210 to communicate from core 0 to core 8 requires fewer hops than using the fine-grained on-chip network 220. Moreover, the coarse-grained on-chip network 210 provides a higher link bandwidth between core 0 and core 8. Thus, the coarse-grained on-chip network 210 provides support for faster global data communication between cores/caches while the fine-grained on-chip network 220 provides support for more local data communication between neighboring cores/caches. A combination of these on-chip networks 210 and 220 provides support for efficient local and global communication while still allowing independent operation of the on-chip networks 210 when necessary to conserve power. Moreover, the combination of on-chip networks 210 and 220 provides flexibility in the types of layers with which the interconnect layer operates.

It should be appreciated that while the example illustrative embodiments set forth above show two meshes of on-chip communication networks overlapping each other and provided in a single interconnect layer of a three-dimensional integrated circuit device, the illustrative embodiments are not limited to this configuration. As mentioned previously, more than two on-chip networks may be provided in the same single interconnect layer depending upon the architecture desired. Each on-chip network preferably provides a different granularity of routers, although this is not required. Each on-chip network is independently operable such that each on-chip network may be independently powered on or off depending upon the desired operational characteristics of the three-dimensional integrated circuit.

Moreover, it should be appreciated that while the illustrative embodiments depict examples in which there is a uniform configuration of the functional units, such as core processors, cache banks, and the like, as well as uniform configurations of the on-chip networks, the illustrative embodiments are not limited to such. Rather, the routers of the on-chip networks may have a non-uniform distance between routers in certain areas of the interconnect layer if so desired. For example, an upper left portion of the interconnect layer may have routers in an on-chip network that are provided at a first wire distance between each other while a second portion in an upper right of the interconnect layer may have routers in the same on-chip network provided at a second, different, wire distance between each other. Similarly, the functional units may be provided with different spacing between the functional units, functional units of different sizes, or the like, such that the layers with which the interconnect layer couples are not uniform in nature. For example, the interconnect layer facilitates the chip integration of heterogeneous processors.

In addition, the illustrative embodiments are not limited to mesh configurations of the wiring patterns that comprise the different on-chip networks of the interconnect layer. To the contrary, other configurations, such as ring configurations, bus configurations, and the like, may be used without departing from the spirit and scope of the illustrative embodiments. The illustrative embodiments are intended to cover all possible configurations of multiple on-chip networks in a single interconnect layer of a three-dimensional integrated circuit device, again with the definition of an on-chip network being an on-chip wiring pattern and associated routers which may be independently powered on/off.

Figure 5:
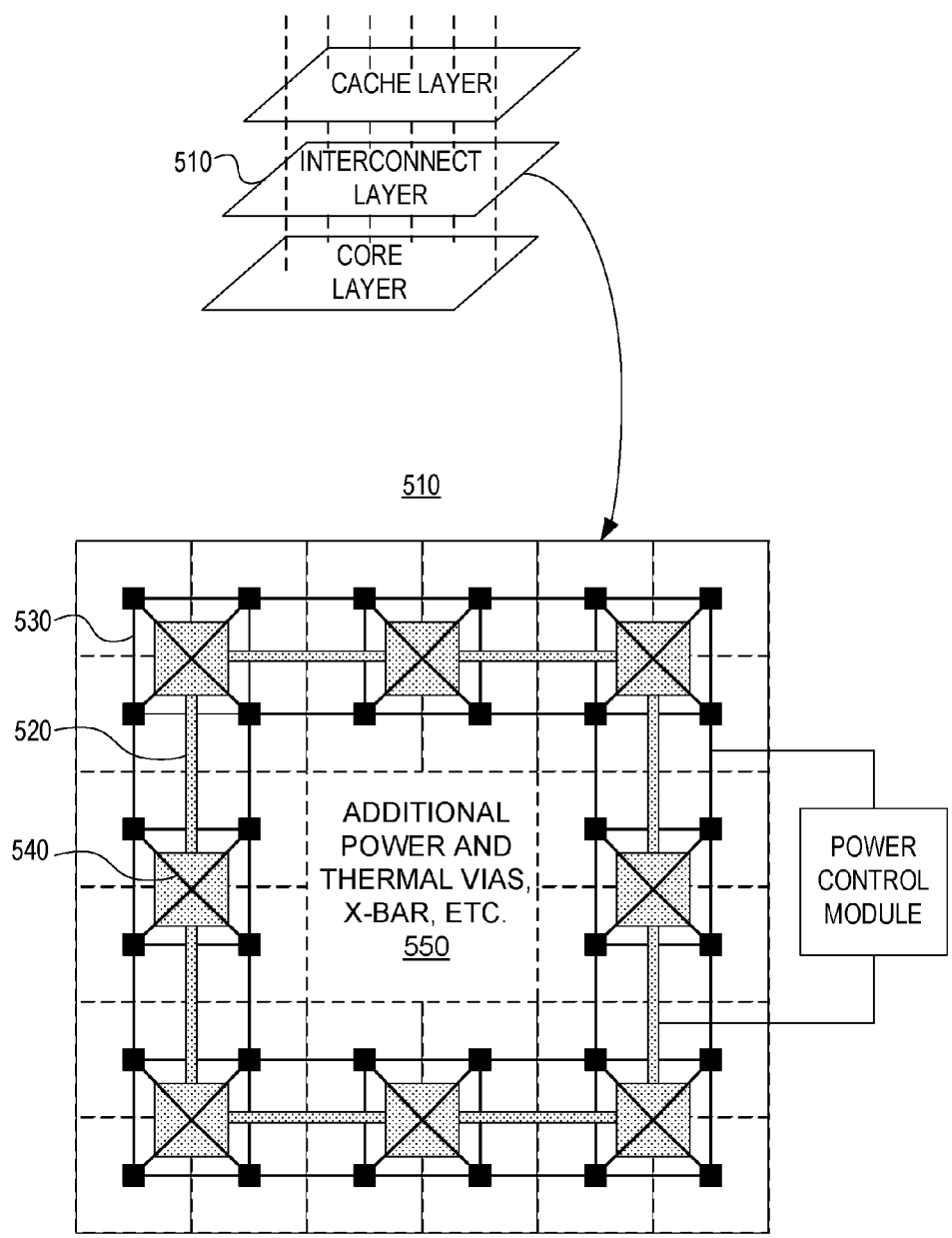
FIG. 5 is an example diagram of a three-dimensional integrated circuit interconnect layer in which overlapping ring on-chip networks are implemented in accordance with one illustrative embodiment.

FIG. 5 is an example diagram of a three-dimensional integrated circuit interconnect layer in which overlapping ring on-chip networks are implemented in accordance with one illustrative embodiment. As shown in FIG. 5, the interconnect layer 510 differs from that of interconnect layer 200 in FIG. 2 primarily in that the on-chip networks 520 and 530 are configured as rings of routers and corresponding wirings with interfaces 540 still being provided for interfacing the on-chip networks 520-530. A center section 550 of the configuration may be left open for additional thermal vias, power lines, clock distribution channels, x-bars, or circuit elements.

Thus, the ring configuration, such as that shown in FIG. 5, allows the center section 550 to be used for other types of circuit elements. For example, this center section 550 may be used for thermal vias in order to provide greater heat dissipation. Moreover, ring configurations, star configurations, and the like, are better configurations for broadcasts, such as for broadcasted commands or the like, than mesh configurations which are better for data communication.

Figure 6:
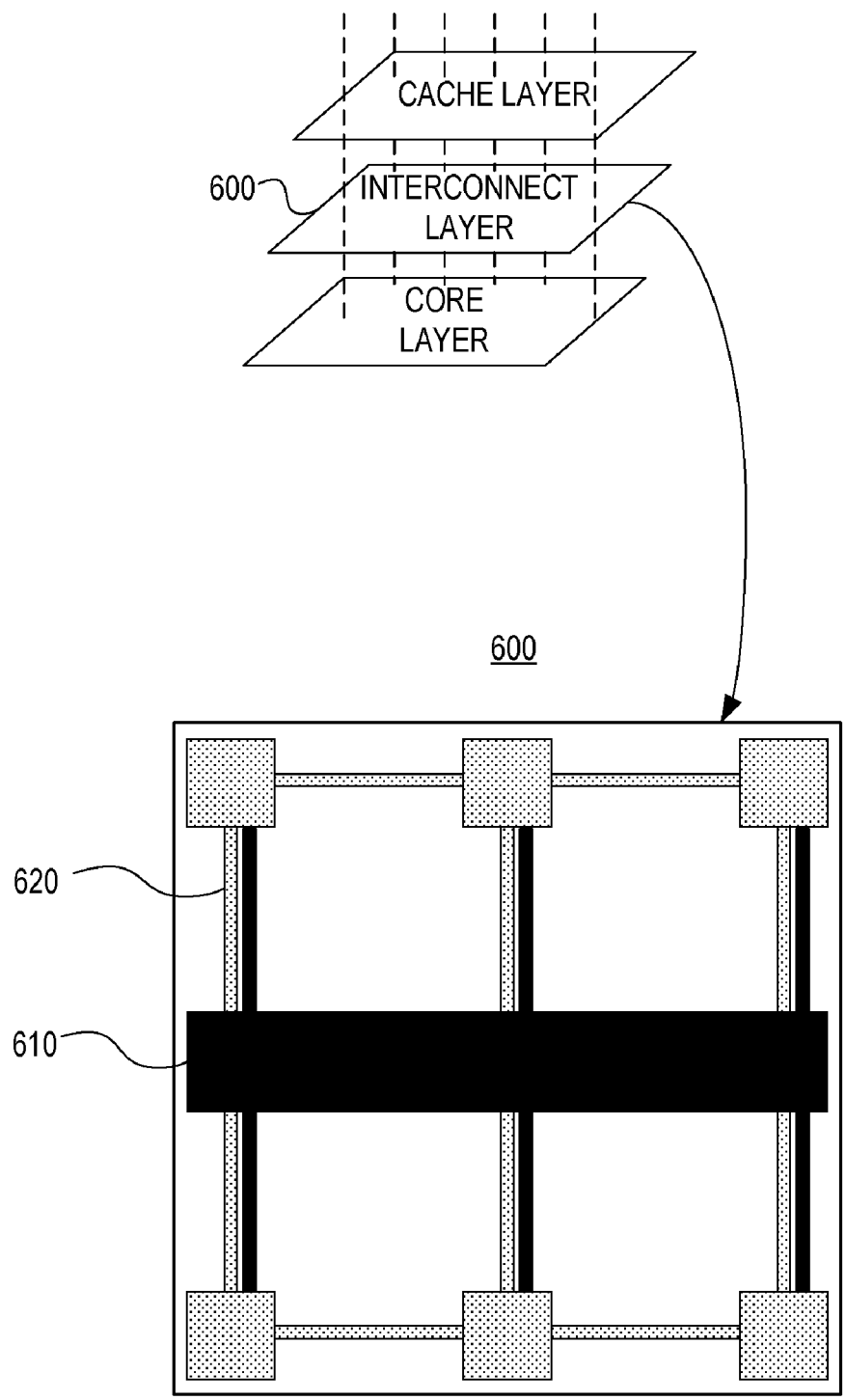
FIG. 6 is an example diagram of a three-dimensional integrated circuit interconnect layer in which an IBM PBus and overlapping mesh network are implemented in accordance with one illustrative embodiment.

FIG. 6 is an example diagram of a three-dimensional integrated circuit interconnect layer in which a PBus and overlapping mesh network are implemented in accordance with one illustrative embodiment. As shown in FIG. 6, the interconnect layer 600 is comprised of a PBus on-chip network 610 and a secondary on-chip network 620 which may be a mesh or grid on-chip network 620 (as depicted), a ring on-chip network, a star on-chip network, or the like. Moreover, it should be appreciated that the PBus on-chip network 510 may be combined with more than one additional on-chip network 620, such as a combination of more than one on-chip ring networks, mesh networks, or the any combination of on-chip network types or configurations.

Thus, the illustrative embodiments provide mechanisms for providing a plurality of on-chip networks in a single interconnect layer of a three-dimensional integrated circuit device. The on-chip networks preferably have different granularities, e.g., a fine-grained on-chip network overlapping a coarse-grained on-chip network, or different topology, e.g. a PBus overlapping a ring on-chip network. Each independent on-chip network may operate independent of the other on-chip network. For example, an on-chip network may be independently powered on or off as desired.

Interfaces may be provided between on-chip networks such that communication may be made across on-chip networks. For example, a router in the fine-grained on-chip network may be coupled to a corresponding router in the coarse-grained on-chip network using this interface, which may be a point-to-point connection, a bus, x-bar, or the like. Communications may be routed from one on-chip network to another and vice versa in order to achieve the most efficient communication path between a source element and a destination element in the three-dimensional integrated circuit device.

The interconnect layer of the illustrative embodiments decoupled the compute layer, or core layer, from the storage layer such that each may be generated using a different technology, process, or even be provided by different vendors. The interconnect layer may accommodate multiple designs with varied numbers of cores, cache banks, etc., and thus provides greater flexibility of use with differing types of layers in the three-dimensional integrated circuit device. For example, using the interconnect layer in FIG. 2 as an example, designs such as 3×3 cores and corresponding cache banks, 6×6 cores and corresponding cache banks, 3×3 cores and 6×6 cache banks, 1×1 big cores and 4×8 small cores and cache banks, 1×3 big cores and 4×6 small cores and cache banks, and the like, are supported by the same interconnect layer shown in FIG. 2.

The circuit as described above is part of the design for a three-dimensional integrated circuit chip. The chip design may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design may then be converted into the appropriate format (e.g., GDSII) for the fabrication of photolithographic masks, which typically include multiple copies of the chip design in question that are to be formed on a wafer. The photolithographic masks may be utilized to define areas of the wafer (and/or the layers thereon) to be etched or otherwise processed.

Figure 7:
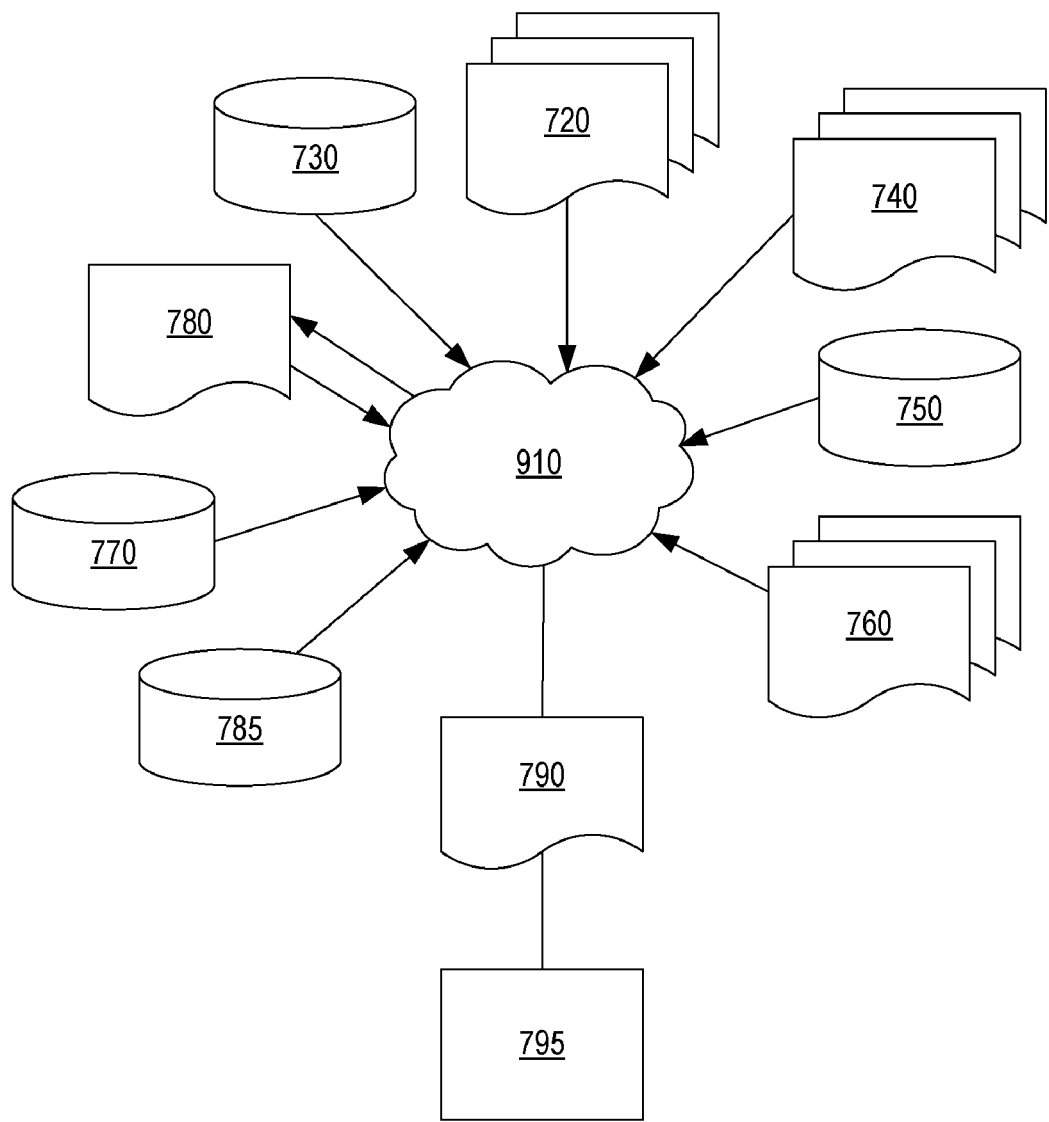
FIG. 7 is a flow diagram of a design process used in semiconductor design, manufacture, and/or test.

FIG. 7 shows a block diagram of an exemplary design flow 700 used for example, in semiconductor design, manufacturing, and/or test. Design flow 700 may vary depending on the type of IC being designed. For example, a design flow 700 for building an application specific IC (ASIC) may differ from a design flow 700 for designing a standard component. Design structure 720 is preferably an input to a design process 710 and may come from an IP provider, a core developer, or other design company or may be generated by the operator of the design flow, or from other sources. Design structure 720 comprises an embodiment of the invention as shown in one or more of FIGS. 2-6 in the form of schematics or HDL, a hardware-description language (e.g., Verilog, VHDL, C, etc.). Design structure 720 may be contained on one or more machine readable medium. For example, design structure 720 may be a text file or a graphical representation of an embodiment of the invention as shown in one or more of FIGS. 2-6. Design process 910 preferably synthesizes (or translates) an embodiment of the invention as shown in one or more of FIGS. 2-6 into a netlist 780, where netlist 780 is, for example, a list of wires, transistors, logic gates, control circuits, I/O, models, etc. that describes the connections to other elements and circuits in an integrated circuit design and recorded on at least one of machine readable medium. This may be an iterative process in which netlist 780 is resynthesized one or more times depending on design specifications and parameters for the circuit.

Design process 710 may include using a variety of inputs; for example, inputs from library elements 730 which may house a set of commonly used elements, circuits, and devices, including models, layouts, and symbolic representations, for a given manufacturing technology (e.g., different technology nodes, 32 nm, 45 nm, 90 nm, etc.), design specifications 740, characterization data 750, verification data 760, design rules 770, and test data files 785 (which may include test patterns and other testing information). Design process 710 may further include, for example, standard circuit design processes such as timing analysis, verification, design rule checking, place and route operations, etc. One of ordinary skill in the art of integrated circuit design can appreciate the extent of possible electronic design automation tools and applications used in design process 710 without deviating from the scope and spirit of the invention. The design structure of the invention is not limited to any specific design flow.

Design process 710 preferably translates an embodiment of the invention as shown in one or more of FIGS. 2-6, along with any additional integrated circuit design or data (if applicable), into a second design structure 790. Design structure 790 resides on a storage medium in a data format used for the exchange of layout data of integrated circuits (e.g. information stored in a GDSII (GDS2), GL1, OASIS, or any other suitable format for storing such design structures). Design structure 790 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in one or more of FIGS. 2-6. Design structure 790 may then proceed to a stage 795 where, for example, design structure 790: proceeds to tape-out, is released to manufacturing, is released to a mask house, is sent to another design house, is sent back to the customer, etc.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor. Moreover, the end products in which the integrated circuit chips may be provided may include game machines, game consoles, hand-held computing devices, personal digital assistants, communication devices, such as wireless telephones and the like, laptop computing devices, desktop computing devices, server computing devices, or any other computing device.

Figure 8:
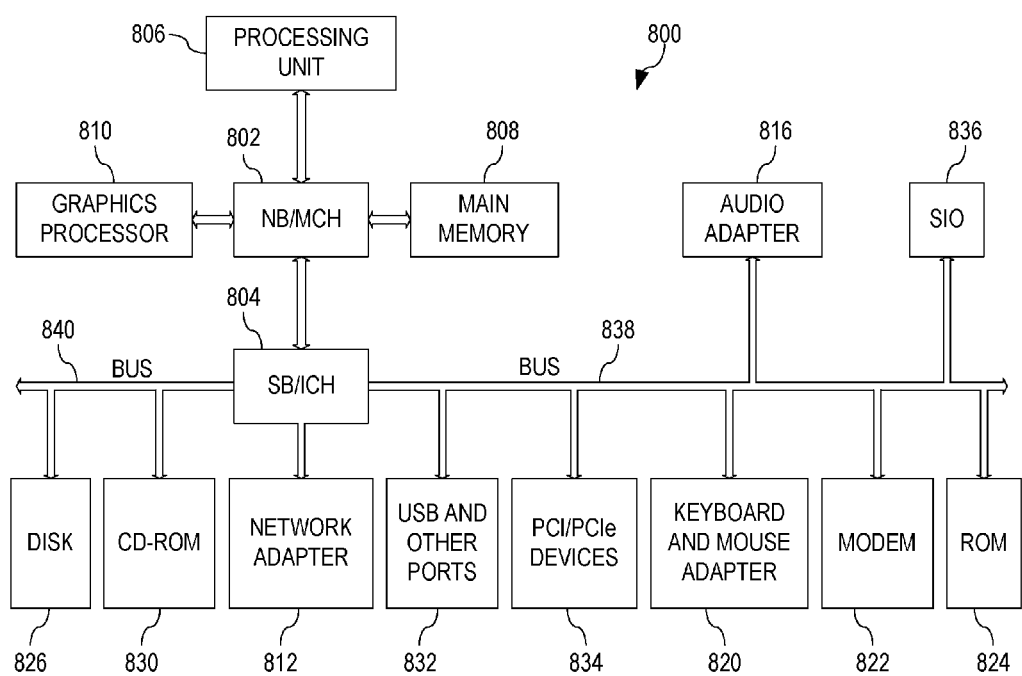
FIG. 8 is an example diagram of a data processing system in which a three-dimensional integrated circuit may be utilized in accordance with one illustrative embodiment.

Thus, the illustrative embodiments may be utilized in many different types of data processing environments. FIG. 8 is an example block diagram of an example data processing system in which aspects of the illustrative embodiments may be implemented. With regard to the illustrative embodiments, the processing unit 806, main memory 808, a cache memory (not shown), and the like, may be integrated into a single three-dimensional integrated circuit device using the multiple on-chip network interconnect layer of the illustrative embodiments.

In the depicted example, data processing system 800 employs a hub architecture including north bridge and memory controller hub (NB/MCH) 802 and south bridge and input/output (I/O) controller hub (SB/ICH) 804. Processing unit 806, main memory 808, and graphics processor 810 are connected to NB/MCH 802. Graphics processor 810 may be connected to NB/MCH 802 through an accelerated graphics port (AGP). Local area network (LAN) adapter 812 connects to SB/ICH 804. Audio adapter 816, keyboard and mouse adapter 820, modem 822, read only memory (ROM) 824, hard disk drive (HDD) 826, CD-ROM drive 830, universal serial bus (USB) ports and other communication ports 832, and PCI/PCIe devices 834 connect to SB/ICH 804 through bus 838 and bus 840. PCI/PCIe devices may include, for example, Ethernet adapters, add-in cards, and PC cards for notebook computers. PCI uses a card bus controller, while PCIe does not. ROM 824 may be, for example, a flash basic input/output system (BIOS).

HDD 826 and CD-ROM drive 830 connect to SB/ICH 804 through bus 840. HDD 826 and CD-ROM drive 830 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 822 or network adapter 812 of FIG. 8, may include one or more devices used to transmit and receive data. A memory may be, for example, main memory 808, ROM 824, or a cache such as found in NB/MCH 802 in FIG. 8.

Those of ordinary skill in the art will appreciate that the hardware in FIG. 8 may vary depending on the implementation. Other internal hardware or peripheral devices, such as flash memory, equivalent non-volatile memory, or optical disk drives and the like, may be used in addition to or in place of the hardware depicted in FIG. 8. Moreover, the data processing system 800 may take the form of any of a number of different data processing systems including client computing devices, server computing devices, a tablet computer, laptop computer, telephone or other communication device, a personal digital assistant (PDA), or the like. In some illustrative examples, data processing system 800 may be a portable computing device which is configured with flash memory to provide non-volatile memory for storing operating system files and/or user-generated data, for example. Essentially, data processing system 800 may be any known or later developed data processing system without architectural limitation.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus, comprising:
    a first integrated circuit layer comprising one or more first functional units;
    an interconnect layer coupled to the first integrated circuit layer; and
    power control logic for independently controlling a powering on/off of the first independent on-chip network and the second independent on-chip network, wherein:
        the first integrated circuit layer and interconnect layer are integrated with one another into a single three-dimensional integrated circuit,
        the interconnect layer comprises a plurality of independent on-chip communication networks that are independently operable and independently able to be powered on and off, each on-chip communication network comprising a plurality of point-to-point communication links coupled together by a plurality of connection points,
        the one or more first functional units are coupled to a first independent on-chip communication network of the interconnect layer, and
        the power control logic operates to power off either the first independent on-chip network or the second independent on-chip network when the on-chip network is not being used.

2. The apparatus of claim 1, further comprising:
    a second integrated circuit layer comprising one or more second functional units, the second integrated circuit layer being coupled to the interconnect layer, wherein the one or more second functional units are coupled to a second independent on-chip communication network of the interconnect layer.

3. The apparatus of claim 1, wherein the first independent on-chip communication network has a different granularity with regard to positioning of connection points than a granularity of the second independent on-chip communication network.

4. The apparatus of claim 2, wherein the first integrated circuit layer is a compute layer and the second integrated circuit layer is a storage layer.

5. The apparatus of claim 2, wherein the one or more first functional units are processor cores and the one or more second functional units are cache banks.

6. The apparatus of claim 1, further comprising:
    one or more interfaces between one or more first connection points of the first independent on-chip communication network and one or more second connection points of the second independent on-chip communication network.

7. The apparatus of claim 2, wherein the first integrated circuit layer is configured using one of a different technology, different processor, or is from a different vendor than is used to configure the second integrated circuit layer.

8. The apparatus of claim 1, wherein the connection points are one of switches, routers, a broadcast bus, or a segmented bus.

9. An apparatus, comprising:
    a first integrated circuit layer comprising one or more first functional units;
    an interconnect layer coupled to the first integrated circuit layer; and
    one or more interfaces between one or more first connection points of the first independent on-chip communication network and one or more second connection points of the second independent on-chip communication network, wherein:
        the first integrated circuit layer and interconnect layer are integrated with one another into a single three-dimensional integrated circuit,
        the interconnect layer comprises a plurality of independent on-chip communication networks that are independently operable and independently able to be powered on and off, each on-chip communication network comprising a plurality of point-to-point communication links coupled together by a plurality of connection points,
        the one or more first functional units are coupled to a first independent on-chip communication network of the interconnect layer, and
        communication from a first functional unit to a second functional unit or from a second functional unit to a first functional unit is achieved using both the first independent on-chip communication network and the second on-chip communication network via the one or more interfaces.

10. An apparatus, comprising:
a first integrated circuit layer comprising one or more first functional units;
an interconnect layer coupled to the first integrated circuit layer; and
a second integrated circuit layer comprising one or more second functional units, the second integrated circuit layer being coupled to the interconnect layer, wherein:
the first integrated circuit layer and interconnect layer are integrated with one another into a single three-dimensional integrated circuit,
the interconnect layer comprises a plurality of independent on-chip communication networks that are independently operable and independently able to be powered on and off, each on-chip communication network comprising a plurality of point-to-point communication links coupled together by a plurality of connection points,
the one or more first functional units are coupled to a first independent on-chip communication network of the interconnect layer, the one or more second functional units are coupled to a second independent on-chip communication network of the interconnect layer, the first independent on-chip communication network of the interconnect layer is configured as one of a mesh or ring configuration with regard to a plurality of first point-to-point communication links and a first plurality of connection points, and
the second independent on-chip communication network of the interconnect layer is configured as a bus configuration with regard to a plurality of second point-to-point communication links and a second plurality of connection points.

11. An apparatus, comprising:
a first integrated circuit layer comprising one or more first functional units;
an interconnect layer coupled to the first integrated circuit layer; and
a second integrated circuit layer comprising one or more second functional units, the second integrated circuit layer being coupled to the interconnect layer, wherein:
the first integrated circuit layer and interconnect layer are integrated with one another into a single three-dimensional integrated circuit,
the interconnect layer comprises a plurality of independent on-chip communication networks that are independently operable and independently able to be powered on and off, each on-chip communication network comprising a plurality of point-to-point communication links coupled together by a plurality of connection points,
the one or more first functional units are coupled to a first independent on-chip communication network of the interconnect layer, the one or more second functional units are coupled to a second independent on-chip communication network of the interconnect layer, and
both the first independent on-chip communication network of the interconnect layer and the second independent on-chip communication network are configured as either a mesh or ring configuration with regard to the plurality of point-to-point communication links and plurality of connection points in the first independent on-chip communication network and second independent on-chip communication network.

12. An interconnect layer for a three-dimensional integrated circuit, comprising:
a first independent on-chip communication network comprising a first plurality of point-to-point communication links and a first plurality of connection points between point-to-point communication links; and
a second independent on-chip communication network comprising a second plurality of point-to-point communication links and a second plurality of connection points between point-to-point communication links; and
power control logic for independently controlling a powering on/off of the first independent on-chip network and the second independent on-chip network, wherein:
each of the first and second independent on-chip communication networks is able to be coupled to one or more integrated circuit layers of the three-dimensional integrated circuit to thereby integrate the one or more integrated circuit layers with the interconnect layer, and
the first and second independent on-chip communication networks are independently operable and independently able to be powered on and off, and
the power control logic operates to power off either the first independent on-chip network or the second independent on-chip network when the on-chip network is not being used.

13. The interconnect layer of claim 12, wherein the first independent on-chip communication network has a different granularity with regard to positioning of the first plurality of connection points than a granularity of the second independent on-chip communication network with regard to the second plurality of connection points.

14. The interconnect layer of claim 12, further comprising:
one or more interfaces between one or more first connection points of the first plurality of connection points, and one or more second connection points of the second plurality of connection points.

15. The interconnect layer of claim 12, wherein the connection points are one of switches, routers, a broadcast bus, or a segmented bus.

16. An interconnect layer for a three-dimensional integrated circuit, comprising:
a first independent on-chip communication network comprising a first plurality of point-to-point communication links and a first plurality of connection points between point-to-point communication links; and
a second independent on-chip communication network comprising a second plurality of point-to-point communication links and a second plurality of connection points between point-to-point communication links, wherein:
each of the first and second independent on-chip communication networks is able to be coupled to one or more integrated circuit layers of the three-dimensional integrated circuit to thereby integrate the one or more integrated circuit layers with the interconnect layer,
the first and second independent on-chip communication networks are independently operable and independently able to be powered on and off, and
in response to the first independent on-chip communication network being coupled to a first integrated circuit layer, and the second independent on-chip communication network being not used, the second independent on-chip communication network is powered off.

17. An interconnect layer for a three-dimensional integrated circuit, comprising:
a first independent on-chip communication network comprising a first plurality of point-to-point communication links and a first plurality of connection points between point-to-point communication links;

a second independent on-chip communication network comprising a second plurality of point-to-point communication links and a second plurality of connection points between point-to-point communication links; and one or more interfaces between one or more first connection points of the first plurality of connection points, and one or more second connection points of the second plurality of connection points, wherein:

each of the first and second independent on-chip communication networks is able to be coupled to one or more integrated circuit layers of the three-dimensional integrated circuit to thereby integrate the one or more integrated circuit layers with the interconnect layer, the first and second independent on-chip communication networks are independently operable and independently able to be powered on and off, and communication from a first functional unit of a first integrated circuit layer to a second functional unit of a second integrated circuit layer, or from the second functional unit to the first functional unit, is achieved using both the first independent on-chip communication network and the second on-chip communication network via the one or more interfaces.

18. An interconnect layer for a three-dimensional integrated circuit, comprising:

a first independent on-chip communication network comprising a first plurality of point-to-point communication links and a first plurality of connection points between point-to-point communication links; and a second independent on-chip communication network comprising a second plurality of point-to-point communication links and a second plurality of connection points between point-to-point communication links, wherein:

each of the first and second independent on-chip communication networks is able to be coupled to one or more integrated circuit layers of the three-dimensional integrated circuit to thereby integrate the one or more integrated circuit layers with the interconnect layer, the first and second independent on-chip communication networks are independently operable and independently able to be powered on and off, the first independent on-chip communication network of the interconnect layer is configured as one of a mesh or ring configuration with regard to a plurality of first point-to-point communication links and a first plurality of connection points, and the second independent on-chip communication network of the interconnect layer is configured as a bus configuration with regard to a plurality of second point-to-point communication links and a second plurality of connection points.

* * * * *